United States Patent
Bhatnagar et al.

(10) Patent No.: US 6,642,159 B1
(45) Date of Patent: Nov. 4, 2003

(54) IMPACT RESISTANT RIGID COMPOSITE AND METHOD FOR MANUFACTURE

(75) Inventors: Ashok Bhatnagar, Richmond, VA (US); Brian Duane Arvidson, Chester, VA (US)

(73) Assignee: Honeywell International Inc., Morristown, NJ (US)

( * ) Notice: Subject to any disclaimer, the term of this patent is extended or adjusted under 35 U.S.C. 154(b) by 179 days.

(21) Appl. No.: 09/639,903

(22) Filed: Aug. 16, 2000

(51) Int. Cl.[7] .................... B32B 27/04; D04H 13/00
(52) U.S. Cl. .................. 442/134; 442/135; 442/327; 428/109; 428/113; 428/292.1; 428/295; 428/297.4
(58) Field of Search .................. 442/134, 135, 442/327; 428/113, 109, 292.1, 295.1, 294.4

(56) References Cited

U.S. PATENT DOCUMENTS

| | | | |
|---|---|---|---|
| 4,403,012 A | 9/1983 | Harpell et al. | 428/290 |
| 4,457,985 A | 7/1984 | Harpell et al. | 428/224 |
| 4,501,856 A | 2/1985 | Harpell et al. | 525/240 |
| 4,543,286 A | 9/1985 | Harpell et al. | 428/288 |
| 4,563,392 A | 1/1986 | Harpell et al. | 428/394 |
| 4,584,347 A | 4/1986 | Harpell et al. | 525/119 |
| 4,613,535 A | 9/1986 | Harpell et al. | 428/113 |
| 4,623,574 A | 11/1986 | Harpell et al. | 428/113 |
| 4,650,710 A | 3/1987 | Harpell et al. | 428/263 |
| 4,681,792 A | 7/1987 | Harpell et al. | 428/102 |
| 4,737,401 A | 4/1988 | Harpell et al. | 428/252 |
| 4,737,402 A | 4/1988 | Harpell et al. | 428/252 |
| 4,738,893 A | 4/1988 | Grillo | 428/252 |
| 4,748,064 A | 5/1988 | Harpell et al. | 428/113 |
| 4,820,568 A | 4/1989 | Harpell et al. | 428/113 |
| 4,883,700 A | 11/1989 | Harpell et al. | 428/113 |
| 4,916,000 A | 4/1990 | Li et al. | 428/105 |
| 4,953,234 A | 9/1990 | Li et al. | 2/412 |
| 5,006,390 A | 4/1991 | Kavesh et al. | 428/105 |
| 5,061,545 A | 10/1991 | Li et al. | 428/195 |
| 5,112,667 A | 5/1992 | Li et al. | 428/113 |
| 5,124,195 A | 6/1992 | Harpell et al. | 428/152 |
| 5,165,989 A | 11/1992 | Bhatnagar et al. | 428/245 |
| 5,167,876 A | 12/1992 | Lem et al. | 252/602 |
| 5,175,040 A | 12/1992 | Harpell et al. | 428/113 |
| 5,185,195 A | 2/1993 | Harpell et al. | 428/102 |
| 5,187,023 A | 2/1993 | Prevorsek et al. | 442/228 |
| 5,190,802 A | 3/1993 | Pilato | 428/111 |
| 5,196,252 A | 3/1993 | Harpell | 428/102 |
| 5,330,820 A | 7/1994 | Li et al. | 428/105 |
| 5,552,208 A | 9/1996 | Lin et al. | 428/113 |
| 5,587,230 A | 12/1996 | Lin et al. | 428/245 |
| 5,789,327 A | 8/1998 | Rousseau | 442/135 |
| 2001/0053645 A1 * | 12/2001 | Henderson | 442/135 |

FOREIGN PATENT DOCUMENTS

WO    WO 91/12136    8/1991    .......... B23B/31/20

* cited by examiner

Primary Examiner—Terrel Morris
Assistant Examiner—Alexis Wachtel
(74) Attorney, Agent, or Firm—Virginia Szigeti

(57) ABSTRACT

An impact resistant rigid composite has a plurality of fibrous layers, each of which comprise a network of filaments. The fibrous layers are disposed in a matrix, with elastomeric layer(s) therebetween. Prior to curing of the matrix, successive fibrous layers exhibit therebetween a peel resistance of at least about 3 g/cm. The composite has high rigidity combined with superior ballistic properties. When bonded at one or both surfaces to a hard plate selected from the group consisting of metals and ceramics, the composite affords increased protection against armor piercing projectiles.

12 Claims, 1 Drawing Sheet

Top view of uni-tape

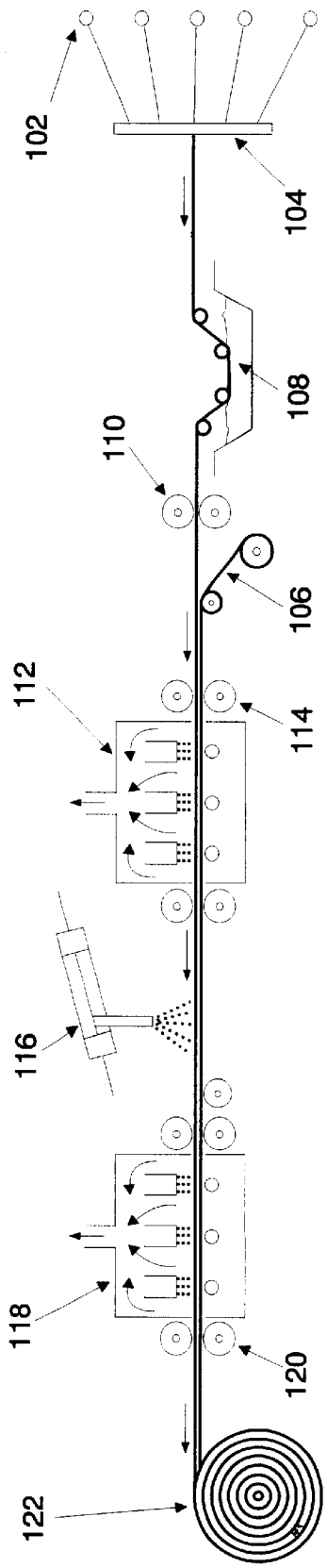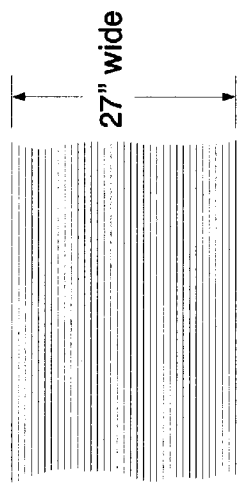
FIG. 1a
FIG. 1b
Top view of uni-tape
27" wide
Figure 1

IMPACT RESISTANT RIGID COMPOSITE AND METHOD FOR MANUFACTURE

BACKGROUND OF THE INVENTION

1. Field of the Invention

This invention relates to a rigid, fiber reinforced composite having improved impact and ballistic resistance, its precursor sub-assembly, and its method of manufacture.

2. Description of the Prior Art

Various constructions are known for composites used in impact and ballistic resistant articles such as helmets, panels, and vests. These composites display varying degrees of resistance to penetration by high speed impact from projectiles such as BB's, bullets, shells, shrapnel, glass fragments and the like. U.S. Pat. Nos. 5,587,230; 5,552,208; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012, PCT Publication No. WO 91/12136, and a 1984 publication of E.I DuPont De Nemours International S.A. entitled "Lightweight Composite Hard Armor Non Apparel Systems with T-963 3300 dtex DuPont Kevlar 29 Fibre" describe ballistic resistant composites which include high strength fibers made from materials such as extended chain ultra-high molecular weight polyethylene and aramids. Such composites are said to be either flexible or rigid depending on the nature of their construction and the materials employed.

Ballistically resistant composites are formed from layers of fabrics or unidirectionally oriented sheets of fibers which are plied together. Where the individual plies are unidirectionally oriented fibers, the successive plies are rotated relative to one another, for example at angles of 0°/90° or 0°/45°/90°/45°/0° or at other angles. In previous processes, the individual plies of fabrics or fibers have been uncoated, or embedded in a polymeric matrix material which filled the void spaces between the fibers. If no matrix was present, the composite was inherently flexible. Bonding to a hard plate was required for rigidity. A contrasting type of construction is a composite consisting of fibers and a single major matrix material. To construct this type of rigid composite, individual plies were bonded together using heat and pressure to adhere the matrix in each ply, forming a bond between them, and fusing the whole into a unitary article.

The matrix resins employed in rigid composites were materials such as a vinyl ester resin or a styrene-butadiene block copolymer, and also mixtures of resins such as vinyl ester and diallyl phthlate or phenol formaldahyde and polyvinyl butyral. The rigidity, impact and ballistic qualities of the resulting composite depended to a high degree on the tensile modulus of the matrix resin. (Except as specifically noted, as used herein the terms tensile modulus and modulus mean the modulus of elasticity as measured by ASTM D638-94 for a matrix or interlayer material and ASTM D2256 for a fiber material.) For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus resins, and also compared to the same fiber structure without a matrix. Unfortunately, low tensile modulus matrix resins, while yielding greater ballistic resistance, also yield lower rigidity composites. In certain applications, particularly those where a composite must function in both anti-ballistic and structural modes, there is needed a superior combination of ballistic resistance and rigidity.

The alternative approaches taken by prior art workers tend to maximize one property at the expense of the other, or to mix low modulus and high modulus materials in a single matrix to achieve a compromise in both properties. Thus, on the one hand, the 1984 DuPont publication cited above discloses the use of orthophthalic polyester resin, which is known to have a high tensile modulus of 800,000 psi (0.55 GPa). The other approach is exemplified by U.S. Pat. No. 4,403,012, which discloses a mixed high modulus phenolic and low modulus polyvinyl butyral resin matrix. A need exists for a rigid composite article that combines high rigidity with high ballistic and impact resistance.

Another problem faced by the skilled man seeking to manufacture rigid ballistic composites in an economical manner is the difficulty of bonding pre-impregnated sheets when the matrix resin is of high modulus. Useful methods of forming a pre-impregnated (prepreged) continuous web are disclosed and illustrated in U.S. Pat. No. 5,149,391 and U.S. Pat. No. 5,587,230, the disclosures of which are hereby specifically incorporated by reference thereto. These methods work well to produce continuous wound rolls of prepreged uniaxially oriented fiber sheet (unitape). The difficulty arises when the wound rolls of unitape are transferred to a cross-ply machine for construction of elementary two layer composites. Such machines are described in U.S. Pat. No. 5,173,138 and U.S. Pat. No. 5,766,725, the disclosures of which are hereby specifically incorporated by reference.

The cross-ply machine has the function of sequentially plying first and second rolls of uniaxially oriented fiber sheets with the longitudinal axis of a second ply rotated with respect to the longitudinal axis of the first ply, consolidating the two plies with heat and pressure, and winding up a continuous roll of cross-plied elementary composite.

Several problems are faced by the skilled man in cross-plying unitapes with high modulus matrix resins, particularly when the resin content is only about 25wt % or below. First, at relatively low temperatures below about 120° F., the adhesion of the unitapes to each other is about the same as to a carrier web or release paper. This makes for difficulties in transferring unitape from the release paper to a second unitape sheet. Second, such resins require combinations of high temperatures, pressures and time in the cross-ply machine in order to consolidate sufficiently to wind up a continuous roll of product. Longer times mean lower production capacity. Higher temperatures can cause premature crosslinking of the matrix resin. Moreover, under these high temperature, pressure and time conditions, the unitape sheets adhere not only to each other, but to the cross-ply machine itself, causing frequent breakdowns and disruptions in production. A need exists for an improved method of producing composite articles with high rigidity and high impact and ballistic resistance using high modulus matrix resins.

SUMMARY OF THE INVENTION

The invention provides an impact resistant rigid composite comprising a plurality of fibrous layers. Each of the layers comprises a network of filaments having a tenacity equal to or greater than about 7 g/denier, a tensile modulus of at least about 150 g/denier, and an energy-to-break of at least about 8 J/g as measured by ASTM D2256. Every fibrous layer is in a matrix having a tensile modulus exceeding about $1\times10^6$ psi (0.69 Gpa) as measured by ASTM D638. An elastomeric layer is disposed between adjacent fibrous layers. The elastomer has a tensile modulus less than about 6000 psi (41,300 kPa) as measured by ASTM D638. The peel resistance between successive fibrous layers prior to curing of the matrix, when pressed at 66° C. for 5 seconds at 332 psi (2,2290 kPa), is at least about 3 g/cm, preferably at least about 5 g/cm. The peel resistance between adjacent fibrous layers is measured by ASTM method D1876-95 where applicable or by the modification of D1876-95 described herein when the fibrous layers are uniaxially oriented.

The composites of the invention have high rigidity combined with superior ballistic properties. Notwithstanding these outstanding properties, it is contemplated that additional protection may be needed against projectiles designed to be armor piercing. To meet this objective, in another embodiment of the invention, the rigid composites disclosed above are bonded at one or both surfaces to a hard plate selected from the group consisting of metals and ceramics.

Yet another embodiment of the invention provides a sub-assembly precursor to an impact resistant rigid composite. Generally stated, the sub-assembly precursor comprises a plurality of fibrous layers. Each of the fibrous layers comprises a network of filaments having tenacity equal to or greater than about 7 g/denier, a tensile modulus of at least about 150 g/denier, and an energy-to-break of at least about 8 J/g. Every fibrous layer is in a thermosetting matrix, which when fully cured has a tensile modulus of at least about $1 \times 10^6$ psi (6895 MPa) as measured by ASTM D638. A layer of elastomer is disposed between the fibrous layers. The elastomer has a tensile modulus less than about 6000 psi (41,300 kPa) as measured by ASTM D638. The peel resistance between the two fibrous layers prior to curing of the matrix, when pressed at 66° C. for 5 seconds at 332 psi (2,2290 kPa), is at least about 3 g/cm, more preferably at least about 5 g/cm.

The invention also provides a method for producing an impact resistant rigid composite, comprising the steps of: (a) forming first and second fibrous network sheets of high strength filaments having a tenacity equal to or greater than about 7 g/denier, a tensile modulus of at least about 150 g/denier, an energy-to-break of at least about 8 J/g; (b) impregnating each of the fibrous network sheets with a matrix resin having a tensile modulus when cured of at least about $1 \times 10^6$ psi (6895 MPa) as measured by ASTM D638; (c) applying to at least one surface of one of the fibrous network sheets a elastomeric material having a tensile modulus less than about 6000 psi (41,300 kPa) as measured by ASTM D638; (d) laying a first fibrous network sheet onto the surface of a second fibrous network sheet with the elastomeric material therebetween; (e) consolidating the first and second fibrous network sheets into two layer composite; (f) plying a plurality of two layer composites one upon another; and (g) consolidating the plurality of two layer composites and fully curing the matrix resin by means of heat and pressure.

It has been found that incorporation of a low modulus elastomeric layer between the rigid fibrous layers markedly improves the impact and anti-ballistic properties of the composite. Surprisingly, the improved properties are obtained without effecting either the glass transition temperature of the matrix or the rigidity of the composite. Articles made in accordance with this invention exhibit improved utility for applications requiring impact and ballistic resistance combined with high rigidity. Representative of such articles are helmets, shields, breastplates, panels and structural members of helicopters and aircraft.

The efficiency and economy of manufacture realized when producing composites of the invention are further improved by the incorporation of low modulus elastomeric layers. Lower temperatures and pressures can be utilized on the cross-ply machinery and sticking problems experienced in continuous operation are avoided.

BRIEF DESCRIPTION OF THE DRAWINGS

The invention will be more fully understood and further advantages will become apparent when reference is had to the following detailed description of the preferred embodiments of the invention and the accompanying drawing, in which:

FIG. 1(a) is a schematic representation of a process for making a fiber network layer and elastomeric layer of the invention, and forming these layers into a consolidated unitape; and FIG. 1(b) is a top plan view of the consolidated unitape shown by FIG. 1a.

DETAILED DESCRIPTION OF THE INVENTION

The present invention provides an improved composite which is particularly useful in ballistic resistant "hard" armor articles. By "hard" armor is meant an article, such as a helmet or panels for military vehicles, which has sufficient mechanical strength so that it maintains structural rigidity when subjected to a significant amount of stress and is capable of being freestanding without collapsing.

As used herein, "fiber" denotes an elongate body, the length dimension of which is much greater than the transverse dimensions of width and thickness. Accordingly, "fiber" includes monofilament, multi-filament, ribbon, strip, staple and other forms of chopped, cut or discontinuous fiber and the like having regular or irregular cross-sections. "Fiber" includes a plurality of any one of the above or a combination of the above.

The cross-sections of filaments for use in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the filaments be of substantially circular, flat or oblong cross-section, most preferably the former.

As used herein, "fiber network" denotes a plurality of fibers arranged into a predetermined configuration or a plurality of fibers grouped together to form a twisted or untwisted yarn, which yarns are arranged into a predetermined configuration. The fiber network can have various configurations. For example, the fibers or yarn may be formed as a felt or other nonwoven, knitted or woven into a network, or formed into a network by any conventional techniques. According to a particularly preferred network configuration, the fibers are unidirectionally aligned so that they are substantially parallel to each other along a common fiber direction.

High strength fibers for use in this invention are those having a tenacity equal to or greater than about 7 g/d, a tensile modulus equal to or greater than about 150 g/d and an energy-to-break equal to or greater than about 8 J/g. Preferred fibers are those having a tenacity equal to or greater than about 10 g/d, a tensile modulus equal to or greater than about 200 g/d and an energy-to-break equal to or greater than about 20 J/g. Particularly preferred fibers are those having a tenacity equal to or greater than about 16 g/d, a tensile modulus equal to or greater than about 400 g/d, and an energy-to-break equal to or greater than about 27 J/g. Amongst these particularly preferred embodiments, most preferred are those embodiments in which the tenacity of the fibers is equal to or greater than about 22 g/d, the tensile modulus is equal to or greater than about 900 g/d, and the energy-to-break is equal to or greater than about 27 J/g. In the practice of this invention, fibers of choice have a tenacity equal to or greater than about 28 g/d, the tensile modulus is equal to or greater than about 1200 g/d and the energy-to-break is equal to or greater than about 40 J/g.

Useful high strength fibers include extended chain polyolefin fibers, particularly extended chain polyethylene (ECPE) fibers, aramid fibers, polybenzazole fibers such as polybenzoxazole and polybenzothiazole, polyvinyl alcohol fibers, polyarmides such as nylon 6, nylon 66, and nylon 46, polyethylene terephthalate, polyethylene naphthalate, polyacrylonitrile, liquid crystal copolyester, glass and carbon fibers.

U.S. Pat. No. 4,457,985 generally discusses such extended chain polyethylene and polypropylene fibers, and the disclosure of this patent is hereby specifically incorporated by reference to the extent that it is not inconsistent herewith. In the case of polyethylene, suitable fibers are those of weight average molecular weight of at least 150,000, preferably at least one million and more preferably between two million and five million. Such extended chain polyethylene fibers may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. No. 3,004,699 and GB No. 2051667, and especially as described in U.S. Pat. No. 4,413,110. Such fibers may also be formed by melt spinning or solid state extrusion. As used herein, the term of polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1 -polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultraviolet screening agents, colorants and the like which are commonly incorporated by reference. Depending upon the formation technique, the draw ratio and temperatures, and other conditions, a variety of properties can be imparted to these filaments. The tenacity of the filaments should be at least 15 g/denier, preferably at least 20 g/denier, more preferably at least g/denier and most preferably at least 30 g/denier. Similarly, the tensile modulus of the filaments, as measured by an Instron tensile testing machine, is at least 300 g/denier, preferably at least 500 gldenier and more preferably at least 1,000 g/denier and most preferably at least 1,200 g/denier. These highest values for tensile modulus and tenacity are generally obtainable only by employing solution spinning processes. Many of the filaments have melting points higher than the melting point of the polymer from which they were formed. Thus, for example, high molecular weight polyethylene of 150,000, one million and two million generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented extended chain polypropylene fibers of weight average molecular weight at least 200,000, preferably at least one million and more preferably at least two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 g/denier, with a preferred tenacity being at least 11 g/denier. The tensile modulus for polypropylene is at least 160 g/denier, preferably at least 200 g/denier. The melting point of the polypropylene is generally raised several degrees by the orientation process, such that the polypropylene filament preferably has a main melting point of at least 168° C., more preferably at least 170° C. The particularly preferred ranges for the aforementioned parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

High molecular weight polyvinyl alcohol (PV—OH) fibers having high tensile modulus are described in U.S. Pat. No. 4,440,711 to Y. Kwon, et al., which is hereby specifically incorporated by reference to the extent it is not inconsistent herewith. High molecular weight PV—OH fibers should have a weight average molecular weight of at least about 200,000. Particularly useful PV—OH fibers should have a modulus of at least about 300 g/denier, a tenacity of at least about 7 g/denier, preferably at least about 10 g/denier, more preferably at least about 14 g/denier and most preferably at least about 17 g/denier, and an energy to break of at least about 8 J/g. PV—OH fibers having a weight average molecular weight of at least about 200,000, a tenacity of at least about 10 g/denier, a modulus of at least about 300 g/denier, and an energy to break of about 8 J/g are more useful in producing a ballistic resistant article. PV—OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of at least about 10 g/denier and an energy to break of at least about 8 J/g. PAN fiber having a molecular weight of at least about 400,000, a tenacity of at least about 15 to 20 g/denier and an energy to break of at least about 8 J/g is most useful; and such fibers are disclosed, for example, in U.S. Pat. No. 4,535,027.

In the case of aramid fibers, suitable aramid fibers formed principally from aromatic polyamides are described in U.S. Pat. No. 3,671,542, which is hereby specifically incorporated by reference. Preferred aramid fibers will have a tenacity of at least about 20 g/d, a tensile modulus of at least about 400 g/d and an energy-to-break at least about 8 J/g, and particularly preferred aramid fibers will have a tenacity of at least about 20 g/d, and an energy-to-break of at least about 20 J/g. Most preferred aramid fibers will have a tenacity of at least about 20 g/denier, a modulus of at least about 900 g/denier and an energy-to-break of at least about 30 J/g. For example, poly(paraphenylenediamine terephalamide) filaments produced commercially by Dupont Corporation under the trade name of Kevlar® 29 and 49 and having moderately high moduli and tenacity values are particularly useful in forming ballistic resistant composites. (Kevlar 29 has 500 g/denier and 22 g/denier and Kevlar 49 has 1000 g/denier and 22 g/denier as values of modulus and tenacity, respectively). Also useful in the practice of this invention is poly(metaphenylene isophthalamide) filaments produced commercially by Dupont under the trade name Nomex®.

Liquid crystal copolyesters fibers suitable for the practice of this invention are disclosed, for example, in U.S. Pat. Nos. 3,975,487; 4,118,372 and 4,161,470.

Polybenzazoles, fibers suited for practice of this invention are disclosed, for example, in U.S. Pat. Nos. 5,286,833, 5,296,185, 5,356,584, 5,534,205 and 6,040,050.

The high strength fiber network is impregnated with or embedded in a matrix composition by applying the matrix composition to the high strength fibers and then consolidating the matrix composition/fibers combination. By "consolidating" is meant that the matrix material and the fiber network layer are combined into a single unitary layer. Consolidation can occur via drying, cooling, heating, pressure or a combination thereof.

The matrix material for use in this invention is a thermosetting resin, preferably soluble in carbon-carbon saturated solvents such as methyl ethyl ketone, and possessing a high tensile modulus when cured of at least about $1 \times 10^6$ psi (6895 MPa) as measured by ASTM D638. Preferred matrix compositions include at least one thermoset vinyl ester, diallyl phthalate, and optionally a catalyst for curing the vinyl ester resin.

Preferably, the vinyl ester is one produced by the esterification of a polyfunctional epoxy resin with an unsaturated monocarboxylic acid, usually methacrylic or acrylic acid. Illustrative vinyl esters include diglycidyl adipate, diglycidyl isophthalate, di-(2,3-epoxybutyl) adipate, di-(2,3-epoxybutyl) oxalate, di-(2,3-epoxyhexyl) succinate, di-(3,4-epoxybutyl) maleate, di-(2,3-epoxyoctyl) pimelate, di-(2,3-epoxybutyl) phthalate, di-(2,3-epoxyoctyl) tetrahydrophthalate, di-(4,5-epoxy-dodecyl) maleate, di-(2,3-epoxybutyl) terephthalate, di-(2,3-epoxypentyl) thiodiproponate, di-(5,6-epoxy-tetradecyl) diphenyldicarboxylate, di-(3,4-epoxyheptyl) sulphonyldibutyrate, tri-(2,3-epoxybutyl)-1,2,4-butanetricarboxylate, di-(5,6-epoxypentadecyl)maleate, di-(2,3-epoxybutyl)azelate, di(3,4-epoxypentadecyl) citrate, di-(4,5-epoxyoctyl) cyclohexane-1,3-dicarboxylate, di-(4,5-epoxyoctadecyl)malonate, bisphenol-A-fumaric acid polyester and similar materials. Particularly preferred are the vinyl esters available from Dow Chemical Company under the trade name Derakane®.

Suitable catalysts, by way of example, include tert-butyl perbenzoate, 2,5-dimethyl-2,5-di-2-ethylhexanoylperoxyhexane, benzoyl peroxide and combinations thereof.

Preferred solvents for the matrix composition are carbon-carbon saturated low boiling solvents including methyl ethyl ketone, acetone, ethanol, methanol, isopropyl alcohol, cyclohexane, ethyl acetate, and combinations thereof. As used herein, "carbon-carbon saturated" denotes a compound wherein all the bonds between carbon atoms are single bonds. In other words, a carbon-carbon saturated compound does not include any unsaturated carbon-carbon double bonds. After consolidation, there is only a trace, if any, of the solvent and catalyst.

The matrix composition applied to the fiber network should include about 35 to 65, preferably 55–65 weight % vinyl ester resin, about 2 to 8, preferably about 3 to 6 weight % diallyl phthalate, with the remainder consisting of low boiling point solvent based on the total weight of the composition. If a curing catalyst is present, it should constitute about 0.05 to 1.0 weight %, preferably about 0.2 to 0.8 weight %. After consolidation, the matrix composition should include about 5 to 15, preferably about 8 to 12, weight % diallyl phthalate, based on the total weight of matrix composition, with the remainder consisting essentially of vinyl ester. The matrix composition may be compounded with fillers such as carbon black, silica, glass microballoons, etc. up to an amount not to exceed about 300% by weight of the matrix resins, preferably not to exceed 100% by weight.

The proportion of matrix composition to fiber in the composite may vary widely, depending upon the end use. If the density of the matrix composition is similar to that of the fiber, then the matrix composition may generally form from about 10 to about 40% by weight, preferably about 14 to 30%, more preferably 16 to 28%, and most preferably about 18 to 24%, based on the weight of an individual layer or the final composite. For ballistic resistant composite articles, the preferred range is up to 28% by weight. If the densities of the matrix composition and fiber are dissimilar, then the matrix composition may form from about 5 to about 40% by volume, preferably about 6 to 30%, more preferably 7 to 24%, and most preferably about 8 to 22%, based on the volume of an individual layer or the final composite The elastomer employed in the practice of the invention may be any elastomer possessing a tensile modulus less than about 6000 psi (41,300 kPa) as measured by ASTM D638 which provides a peel resistance between adjacent fiber layers prior to curing of the matrix, when pressed at 66° C. for 5 seconds at 332 psi (2,2290 kPa), at least about 5 g/cm as determined by the peel resistance test of ASTM 1876-72. A wide variety of elastomeric materials and formulations may be utilized in this invention. Representative examples of suitable elastomers have their structures, properties and formulations summarized in the Encyclopedia of Polymer Science, Volume 5 in the section Elastomers-Synthetic (John Wiley & Sons Inc. 1964). The essential requirement is that they have the appropriately low moduli and yield the required peel resistance. For example, the following materials may be employed: polybutadiene, polyisoprene, natural rubber, ethylene-propylene copolymers, ethylene-propylene diene terpolymers, thermoplastic elastomers and others. Preferably, the elastomer possesses a tensile modulus less than about 2000 psi (13,800 kPa). Most preferably, the elastomer possesses a tensile modulus less than about 1000 psi (6895 kPa)

Particularly useful are block copolymers of conjugated dienes and vinyl aromatic monomers. Many of these polymers are produced commercially by the Shell Chemical Company and described in the bulletin "Kraton Thermoplastic Rubber", SC:68:82. Most preferred is a styrene/butadiene copolymer-polyterpene-polydipentene composition. This material is produced commercially by 3M Inc. and sold in cyclohexane/acetone solution under the tradename Scotch-Grip®.

The elastomer layer constitutes only a minor part of the composite, from about 2 to 10 weight percent of the composite. Preferably, the elastomer constitutes from about 2 wt % to about 7 wt % of the composite. The elastomer layer need not be continuous and may consist of discrete areas on the fibrous layer. Preferably, the discrete areas of elastomeric coverage are uniformly distributed on the surface of the fibrous layer.

It is convenient to characterize the geometries of the composites of the invention by the geometries of the fibers. One such suitable arrangement is a fiber network layer in which the fibers are aligned parallel to one another along a common fiber direction (referred to herein as a "unidirectionally aligned fiber network"). Successive layers of such unidirectionally aligned fibers can be rotated with respect to the previous layer. Preferably, the fiber network layers of the composite are crossplied, that is, with the fiber direction of the unidirectional fibers of each network layer rotated with respect to the fiber direction of the unidirectional fibers of the adjacent layers. An example is a five layer article with the second, third, fourth and fifth layers rotated +45°, −45°, 90° and 0° with respect to the first layer. A preferred example includes two layers with a 0°/90° layup. Such rotated unidirectional alignments are described, for example, in U.S. Pat. Nos. 4,457,985; 4,748,064; 4,916,000; 4,403,012; 4,623,573; and 4,737,402.

In general, the fibrous layers of the invention are formed by applying the matrix composition to the high strength fibers and then consolidating the matrix material/fibers combination. For example, the fiber or yarn can be transported through a solution of the matrix composition to substantially coat the fiber or yarn and then dried to form a coated fiber or yarn. The resulting coated fiber or yarn can then be arranged into the desired network configuration. Alternatively, the fiber network can be constructed initially and then coated with the matrix composition.

The fiber networks can be constructed via a variety of well known methods. In the preferred case of unidirectionally aligned fiber networks, yarn bundles of high strength filaments, preferably having about 30 to about 2000 individual filaments of less than about 12 denier, and more preferably of about 100 individual filaments of less than about 7 denier/filament, are supplied from a creel and led through guides and one or more spreader bars into a collimating comb prior to coating or impregnating with the matrix material. The collimating comb aligns the filaments coplanarly and in a substantially unidirectional fashion. The fiber network layers typically contain from about 6 to 12 yarn ends per inch (2.4 to 4.7 ends per cm) and preferably 8 to 11 ends per inch (3.2 to 4.3 ends per cm). Each fiber network layer (including matrix material) is typically from about 0.01 to 0.2, preferably about 0.04 to 0.12, and most preferably about 0.06 to 0.10 mm thick.

The preferred method of forming the fibrous layer and elastomeric layer of the invention includes initially forming the fiber network layer, preferably a unidirectional network as described above, applying a solution of the matrix composition onto the fiber network layer, and then drying the matrix-impregnated fiber network layer as described, for example, in U.S. Pat. No. 5,552,208, specifically incorporated herein by reference. As shown in FIG. 1, yarn 102 is supplied from a creel and passed through a combing station 104 to form the unidirectional fiber network. The fiber network is carried into a tank 108 wherein it is impregnated with a solution of the matrix resin. The coated fiber network then is passed through a pair of rollers 110. The rollers squeeze out excess matrix solution and spread the matrix composition substantially uniformly among and between the filaments. The coated fiber network then is placed on a carrier web, which can be a paper or a film substrate 106.

Nip roller 114 is used to control the layer thickness. The impregnated fiber network layer is then passed through a first heated oven 112 for drying. In the oven, the impregnated fiber network layer (unitape) is subjected to sufficient heat to volatilize the solvent in the matrix composition. An elastomer layer is applied to the top surface of the fiber network by spraying a solution at 116. The elastomer layer need not be continuous. It may be formed of discrete drops of spray, preferably uniformly distributed on the surface of the fiber network. Alternative to the elastomer layer being applied by means of a spray, the elastomer layer may also be applied by running the fiber network under a roller (not shown) in contact with a reservoir containing an elastomer solution. The fiber network with the elastomer layer is passed through a second heated oven 118 to volatilize the solvent in the elastomer composition. Nip roller 120 is used to pull the carrier web and unitape through the system. The substrate and the consolidated unitape can then be wound into a continuous roll on roller 122.

The consolidated unitape can be cut into discrete sheets and laid up into a stack for formation into the end use composite or they can be formed into a sub-assembly precursor which is subsequently used to form the end use composite. By "end use composite" is meant the integral multi-layer composite, which is an article of the invention such as a helmet or vehicle armor plate. As mentioned previously, the most preferred composite is one wherein the fiber network of each layer is unidirectionally aligned and oriented so that the fiber directions in successive layers are in a 0°/90° configuration.

In the most preferred embodiment, two fiber network layers are cross-plied in the 0°/90° configuration and then molded to form a sub-assembly precursor. The two fiber network layers can be continuously cross-plied, preferably by cutting one of the networks into lengths that can be placed successively across the width of the other network in a 0°/90° orientation. U.S. Pat. Nos. 5,173,138 and 5,766,725 describe apparatus for continuous cross-plying. As described in PCT Publication No. WO 91/12136, the resulting continuous two-ply sub-assembly can then be wound into a roll with a layer of separation material between each ply. When ready to form the end use composite, the roll is unwound and the separation material stripped away. The two-ply sub-assembly is then sliced into discrete sheets, stacked in multiple plies and then subjected to heat and pressure in order to form the finished shape and cure the matrix resin.

The temperatures and/or pressures to which the fiber networks are exposed for molding vary depending upon the type of high strength fiber used. The end use composite for use in armor panels can be made by molding a stack of two layer sub-assemblies under a pressure of about 150 to 400 psi (1,030 to 2,760 kPa) preferably about 180 to 250 psi (1,240 to 1,720 kPa) and a temperature of about 104° C. to 127° C. The end use composite for use in helmets can be made by molding a stack of two layer sub-assemblies under a pressure of about 1500 to 3000 psi (10.3 to 20.6 MPa) and a temperature of about 104° C. to 127° C.

The composites of the invention combine high rigidity with improved impact and ballistic resistance as compared to prior art composites lacking the interply elastomer layers. Without being held to a particular theory of why the invention works, it is believed that the interply elastomer acts to blunt cracks and to disperse stresses propagating through the composite under shock loads. If the modulus of the interply layer is too high, the stresses are able to propagate relatively unimpeded. The small content of interply material, while effective in improving impact properties is not sufficient to diminish rigidity. Differential scanning calorimetry (DSC) has shown no significant effect of the interply material on the glass transition temperature of the matrix.

The following examples are presented to provide a more complete understanding of invention. The specific techniques, conditions, materials, proportions and reported data set forth to illustrate the principles of the invention are exemplary and should not be construed as limiting the scope of the invention.

Peel resistance between the fibrous layers is measured by ASTM D1876-95 where applicable and by the following modification of ASTM D1876-95 when the fibrous layers are unitapes with the fibers in adjacent layers at 0°/90°.

The peel resistance test specimen is 6 inches×2 inches (15.2 cm×5.08 cm) comprising a first fibrous layer, an interlayer, a second fibrous layer and north, south, east and west edges. The filaments in the first fibrous layer are aligned parallel to the long dimension of the specimen in the north-south direction. The filaments in the second fibrous layer are aligned parallel to the short dimension of the specimen in the east-west direction. Two one-quarter inch (0.63 cm) slits are cut in the south edge of the specimen in the north-south direction; one at a distance one-half inch (1.27 cm) from the east edge and the other one-half inch (1.27 cm) from the west edge. The two slits create three tabs in the south edge of the specimen; a one inch (2.54 cm) wide center tab and two half-inch (1.27 cm) tabs on either side of the center tab.

The two half-inch tabs (1.27 cm) are gripped in one clamp of a testing machine such as manufactured by Instron Corporation. The center one-inch (2.54 cm) tab is gripped in the opposing clamp of the testing machine. The clamps are separated at a speed of 10 inches/min (25.4 cm/min) peeling the first fibrous layer from the second fibrous layer. The force required to separate the clamps is measured and recorded. The average force for separation is determined after an initial peak as described in ASTM D1876-95 and reported as the peel resistance.

The total areal density (ADT) indicates the weight of the composite per unit area. It is expressed in units of $Kg/m^2$.

Fragment ballistic testing of the examples is performed in accordance with Military Specification MIL STD 662E using 17 grain, 22 caliber, FSP hardened fragment simulators. One measure of the protective power of a sample composite is expressed by citing the impacting velocity at which 50% of the projectiles are stopped. This velocity, expressed in units of m/sec, is designated the $V_{50}$ value. A higher $V_{50}$ is to be expected for composites of higher areal density. A second measure of the protective power of a composite is normalized for the total areal density (ADT) of the composite. The energy of the projectile absorbed by the composite at the $V_{50}$ velocity in proportion to the total areal density of the composite is termed the Specific Energy Absorption of the Composite (SEAC). The SEAC is expressed in units of $J/Kg/m^2$, or equivalently $J-m^2/Kg$.

Flexural moduli of the composites of the examples are measured by ASTM D790.

Impact properties of the composites of the examples are measured by Delsen Testing Laboratories, Inc. using Suppliers of Advanced Composite Materials Association (SACMA) Test Method SRM 2R-94.

EXAMPLES

Example 1

225 ends of 1100 denier extended chain polyethylene yarn manufactured by Honeywell International under the trade name SPECTRA 1000™ are fed from a creel into a prepregging process as illustrated in FIG. 1. The yarns are spread, combed and placed on a silicone coated release paper. A matrix solution consisting of 5000 parts of a resin solution and 35 parts of a catalyst are applied to the uniaxial fiber web. The resin solution obtained from Dow Chemical Co. consists of 64 wt % vinyl ester resin, 3 wt % diallyl phthalate and 33 wt % methyl ethyl ketone. The catalyst obtained from Elf Atochem is 2,5-dimethyl-2,5 di-(2-ethyl (hexanoylperoxy) hexane. The fiber web is passed under a nip roll to spread the matrix solution and force the solution through and between the filaments of the yarns. The fiber web is carried through the first heated oven at a temperature of 82° C. and the solvent is dried from the matrix. An elastomer solution consisting of about 10 wt % styrene/butadiene copolymer, about 10 wt % polyterpene, about 10 wt % polydipentene, about 10 wt % acetone and about 60 wt % cyclohexane (trade name Scotch-Grip® obtained from 3M Co.) is sprayed on the web uniformly in discrete droplets. The solvent is dried from the elastomer solution on passing through the second oven at a temperature of 82° C. The web is carried through a final nip roll and wound up as continuous unitape rolls The unitape consists of 81 wt % fiber 16 wt % matrix, and 3 wt % elastomer.

A sample of the above described elastomer solution is evaporated in the open air at room temperature. The tensile modulus of the dry elastomer is measured by ASTM D638. Its tensile modulus is 406 psi (2,800 kPa).

A first and second roll of the unitape is carried to a cross-ply machine as described in U.S. Pat. No. 5,173,138. A two layer sub-assembly is formed with the fibers in the layers at 0°/90° orientation. The cross-plying consolidation is conducted by passing the layers under a roller at a temperature of 66° C. under a pressure of about 332 psi (2,290 kPa). The dwell time of a given area under the pressure of the roller is about 5 seconds. The peel resistance between the layers of the cross-plied sub-assembly is measured to be 21 g/cm. The glass transition temperature of the matrix in the sub-assembly is measured by DSC at a heating rate of 5° C./min in three determinations as 91.3° C., 87.4° C., and 85.1° C.

Fifty-one plies of the cross-plied sub-assemblies are stripped from the release paper and stacked and molded at 121° C. and 1800psi (12,400kPa) to form a composite having an areal density (ADT) of 4.84 $Kg/m^2$ (0.99 lb/sq.ft.)

Example 2 (Comparative)

Continuous unitape rolls are produced as in Example 1 except that no elastomer is used but all other materials and conditions are identical. The unitape, consists of 81 wt. % fiber and 19 wt. % matrix. A first and second roll of the unitape is carried to the same cross-ply machine as in Example 1.

Attempts are made to cross-ply the unitape at consolidation temperatures ranging from room temperature up to 116° C. At lower temperatures, the unitape remains stuck to the release paper and the fill and warp plies do not adhere to one another. Increasing the pressure between the plies does not improve adhesion. At 116° C. the matrix in the unitape becomes very soft and sticky. However, the bond between the plies is no greater than the bond of the unitape to the release paper. Many temperatures are tried between 38° C. and 116° C. to ascertain a temperature where the material will be sticky enough to cross-ply and have more affinity ply-to-ply than to the release paper. Different release papers are tried which have better release properties to the point where the unitape is nearly falling off the paper before the cross-ply operation. Again the unitape plies do not stick to each other at low temperature, and when heated the fill ply sticks to the paper as much as to the warp ply. No cross-ply operation is possible on the machine.

To prepare a composite comparable to that in Example 1, sheets of the uniply are cut, leaving them on the release paper. The sheets are cross-plied unitape-to-unitape with the release paper on the outside and pressed at 66° C. at 200 psi (1380 kPa) for 20 min. This would be an impractical dwell time for a continuous process. The sheets are removed from the press, and allowed to cool to room temperature. At this point the release paper can be stripped from the two layer sub-assembly.

The glass transition temperature of the matrix in the sub-assembly is measured by DSC at a heating rate of 5° C./min in three determinations as 83.2° C., 84.7° C., and 86.2° C. By comparison with the glass transition temperature in Example 1, it is seen that the matrix resin in Example 1 is not effected by the presence of the elastomer layer.

As in Example 1, fifty-one plies of the sub-assemblies are stacked and molded at 121° C. and 1800 psi (12,400 kPa) to form a composite having an areal density (ADT) of 5.09 Kg/m² (1.04 lb/sq.ft.)

Example 3

The composites of Example 1 and (Comparative) Example 2 are tested for ballistic resistance as described heretofore. The results were as follows:

|  | Example 1 | Example 2 (Comparative) |
| --- | --- | --- |
| ADT, Kg/m² | 4.84 | 5.09 |
| $V_{50}$, m/sec | 540 | 514 |
| SEAC, J/Kg/m² | 33 | 29 |

It is seen that the Specific Energy Absorption of the Composite (SEAC) of the invention exceeds that of the prior art material by 13.8%.

Example 4

A composite of the invention is prepared as in Example 1 except that the proportions of fiber, matrix and elastomer in the unitape are 83 wt % fiber, 14 wt % matrix and 3 wt % elastomer.

Example 5 (Comparative)

A composite is prepared as in Comparative Example 2 except that the proportions of fiber and matrix in the unitape are 80 wt % fiber and 20 wt % matrix.

Example 6

The composites of Example 4 and (Comparative) Example 5 are tested for flexural modulus and impact properties as described heretofore. The results are as follows:

| Composite | Impact Properties | | |
| --- | --- | --- | --- |
|  | Flexural Modulus, GPa | Absorbed Energy, Joules | Duration, Msec |
| Example 4 | 16.9 | 13.1 | 10.1 |
| Example 5 (Comparative) | 16.9 | 7.1 | 16.2 |

It will be seen that the rigidity (flexural modulus) of the composite of the invention is identical to the prior art composite. Moreover, the energy absorption capability of the composite of the invention exceeds that of the prior art material by 84% and the duration of the impact event is much shorter. This means less denting and less delamination during the impact event, an important quality for applications such as helmets.

Example 7

A composite of the invention is prepared as in Example 1 except that a solution of Kraton D1107 is applied as the elastomer and the proportions of constituents in the unitape are 75 wt % fiber, 18 wt % matrix and 7 wt % Kraton D1107. The tensile modulus of Kraton D1107 is measured as 196 psi (1,350 kPa). The composite consists of 51 plies of the sub-assemblies and has an areal density of 5.19 Kg/m²(1.06 lb/sq.ft.).

Ballistic testing of this composite shows a $V_{50}$ of 549 m/sec and an SEAC of 32 J/Kg/m². It will be seen that the ballistic properties are superior to the prior art material of (Comparative) Example 2.

Examples and Comparative Examples 8–13

A unitape sheet is prepared as in Example 1 using the same yarn and matrix resin. A series of samples are prepared from this unitape where solutions of interlayer materials having different tensile moduli are sprayed on its surface and dried at a temperature of 82° C. In Examples 8–and Comparative Example 12, the unitape contains 16 wt % matrix. In Comparative Example 13, the unitape contains 19 wt % matrix. In Examples 8–11, the interlayer constitutes 3 wt % of the unitape. Sheets of the unitapes are cut, leaving them on the release paper. The release paper is SILOX® 3.2D2D/D6B purchased from the Akrosil Division of International Paper Co. The unitape sheets are cross-plied unitape-to-unitape with the release paper on the outside and pressed at 66° C. for 5 seconds at 332 psi (2,290 kPa). The sheets are removed from the press, and allowed to cool to room temperature. The peel resistance is then measured A) between the layers of the unitape, and B) between the cross-plied unitape and the release paper, both by ASTM D 1876-72. The results are as follows:

| Example Or Comparative Example | Interlayer Material | Interlayer Tensile Modulus, psi (kPa) | Peel Resistance, g/cm | | |
| --- | --- | --- | --- | --- | --- |
| | | | Unitape -to- Unitape, A | Unitape -to- Release Paper, B | Ratio, A/B |
| Ex. 8 | Kraton D1107 | 196 (1,350) | 17.5 | 1.25 | 14.0 |
| Ex. 9 | Scotch-Grip | 406 (2,800) | 21.8 | 2.7 | 8.1 |

-continued

| Example Or Comparative Example | Interlayer Material | Interlayer Tensile Modulus, psi (kPa) | Peel Resistance, g/cm Unitape-to-Unitape, A | Unitape-to-Release Paper, B | Ratio, A/B |
|---|---|---|---|---|---|
| Ex. 10 | Dynaflex D3204 | 509 (3,510) | 15.6 | 1.1 | 14.5 |
| Ex. 11 | Kraton G1650 | 3,279 (22,610) | 11.8 | 1.1 | 11.0 |
| Ex. 12 Control Comparative | None | | <0.2 | 1.8 | <1 |
| Ex. 13 Control Comparative | None | | <0.2 | 2.0 | <1 |

Scotch-Grip is a 3M Co. product comprising a cyclohexane/acetone solution of styrene-butadiene polymer, polyterpene resin, and dipentene polymer.

Kraton D1107 and Kraton G1650 are products of Shell Chemical Co. Kraton D1107 is a styrene-isoprene-styrene block copolymer. Kraton G1650 is a styrene-ethylene-butadiene-styrene copolymer.

Dynaflex D3204 is a thermoplastic elastomer product of GLS Corporation.

In order that a cross-plying operation will run continuously, it is necessary that adhesion between uniply sheets is greater than between the uniply and release paper under the pressure, temperature and dwell time conditions of the machine. It will be seen that in none of Examples 8 to 13 does the peel resistance, unitape-to-release paper, rise above 2.7 g/cm. Therefore, the requirement that peel resistance ratio of Column A/Column B be greater than 1.0 is satisfied when adjacent fibrous layers pressed at 66° C. for 5 seconds at 332 psi (2,290 kPa) have a peel resistance at least about 3 g/cm. Preferably, the peel resistance between adjacent fibrous layers is at least about 5 g/cm. Most preferably, the peel resistance is at least 10 g/cm.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. An impact resistant rigid composite, comprising:
   (a) a plurality of fibrous layers, each of said layers comprising a network of filaments having a tenacity equal to or greater than about 7 g/denier, a tensile modulus of at least about 150 g/denier, and an energy-to-break of at least about 8 J/g, as measured by ASTM D2256, said fibrous layers being in a matrix having a tensile modulus of at least about $1 \times 10^6$ psi (6895 Mpa,) as measured by ASTM 0638; and
   (b) a layer of elastomer disposed between adjacent fibrous layers and having a tensile modulus less than about 6,000 psi (41,300 kPa), as measured by ASTM D638, said elastomer providing a peel resistance of at least about 3 g/cm as determined on uncured fibrous layers with said elastomer therebetween after pressing at 66° C. for 5 seconds at 332 psi (2,290 kPa).

2. An impact resistant composite as recited by claim 1, wherein the filaments in the network are selected from the group consisting of extended chain polyethylene, aramid and polybenzazole.

3. An impact resistant composite as recited by claim 1, wherein the elastomer in the elastomeric layers has a tensile modulus less than about 4000 psi (13,800 kPa) as measured by ASTM D638.

4. An impact resistant composite as recited by claim 1, wherein the elastomer in the elastomeric layers has a tensile modulus less than about 1000 psi (6895 kPa) as measured by ASTM D638.

5. An impact resistant composite as recited by claim 1, wherein the filaments in the network have a tenacity equal to or greater than about 16 g/d, a tensile modulus equal to or greater than about 400 g/d and an energy to break equal to or greater than about 27 J/g.

6. An impact resistant composite as recited by claim 1, wherein the peel resistance is at least about 10 g/cm.

7. An impact resistant composite as recited by claim 1, wherein the matrix comprises about 14 to 30 wt % of the composite and the elastomeric layers comprise between about 2 and about 10 wt % of the composite.

8. An impact resistant composite as recited by claim 1, wherein said fibrous network comprises a sheet-like filament array in which said filaments are arranged substantially parallel to one another along a common filament direction and wherein successive fibrous layers have filament directions rotated with respect to one another.

9. An impact resistant composite as recited by claim 8, wherein the directions of the filaments in successive layers are rotated 90 degrees to one another.

10. An impact resistant composite as recited by claim 8, wherein a plate is bonded to a surface of the composite and wherein the plate comprises one or more materials selected from the group consisting of a metal and a ceramic.

11. An impact resistant composite as recited by claim 8, wherein a plate is bonded to a surface of the composite and the plate comprises one or more materials selected from the group consisting of steel, titanium, aluminum oxide and boron carbide.

12. An uncured composite comprising:
   (a) a plurality of fibrous layers, each of said layers comprising a network of filaments having a tenacity equal to or greater than about 7 g/denier, a tensile modulus of at least about 150 g/denier, and an energy-to-break of at least about 8 J/g, said fibrous layers being disposed in an uncured thermosetting matrix which, when fully cured, has a tensile modulus of at least about $1 \times 10^6$ psi (6895 MPa), as measured by ASTM D638; and
   (b) a layer of elastomer between the fibrous layers, said elastomer having a tensile modulus less than about 6000 psi (41,300 kPa), as measured by ASTM D638, and providing a peel resistance of at least about 3 g/cm after pressing at 66° C. for 5 seconds at 332 psi (2,290 kPa).

* * * * *